United States Patent
Park et al.

(10) Patent No.: US 11,848,410 B2
(45) Date of Patent: Dec. 19, 2023

(54) BATTERY CELL AND METHOD FOR MANUFACTURING BATTERY CELL

(71) Applicant: LG Chem, Ltd., Seoul (KR)

(72) Inventors: Sung-Ryul Park, Daejeon (KR); Won-Seok Chang, Daejeon (KR)

(73) Assignee: LG Energy Solution, Ltd.

( * ) Notice: Subject to any disclaimer, the term of this patent is extended or adjusted under 35 U.S.C. 154(b) by 192 days.

(21) Appl. No.: 17/113,291

(22) Filed: Dec. 7, 2020

(65) Prior Publication Data

US 2021/0091367 A1 Mar. 25, 2021

Related U.S. Application Data

(62) Division of application No. 15/768,325, filed as application No. PCT/KR2017/000827 on Jan. 24, 2017, now abandoned.

(30) Foreign Application Priority Data

Jan. 29, 2016 (KR) .................. 10-2016-0011418

(51) Int. Cl.
  *H01M 10/42* (2006.01)
  *H01M 10/058* (2010.01)
  (Continued)

(52) U.S. Cl.
  CPC ..... *H01M 10/0413* (2013.01); *H01M 10/058* (2013.01); *H01M 10/42* (2013.01);
  (Continued)

(58) Field of Classification Search
  CPC .......... H01M 50/636; H01M 10/0413; H01M 10/058; H01M 10/42; H01M 50/60;
  (Continued)

(56) References Cited

U.S. PATENT DOCUMENTS 3,534,785 A 10/1970 Bensen
5,487,417 A * 1/1996 Kasahara ............. H01M 50/60
  141/34

(Continued)

FOREIGN PATENT DOCUMENTS

JP 2000215882 A 8/2000
JP 2001210309 A 8/2001

(Continued)

OTHER PUBLICATIONS

Search report from International Application No. PCT/KR2017/000827, dated Apr. 27, 2017.

(Continued)

*Primary Examiner* — Muhammad S Siddiquee
(74) *Attorney, Agent, or Firm* — Lerner David LLP

(57) ABSTRACT

Disclosed is a battery cell, which includes an electrode assembly, a pair of electrode leads electrically connected to the electrode assembly, a battery case configured to accommodate the electrode assembly and expose a portion of the pair of electrode leads to the outside, an electrolyte injection hole formed in the battery case and connectable to an electrolyte injecting device that injects an electrolyte in a vacuum state so that the electrolyte is injected into the battery case, and an injection hole cap configured to cover the electrolyte injection hole and mounted to the electrolyte injection hole so as to be detachable from the electrolyte injection hole by user manipulation.

7 Claims, 10 Drawing Sheets

(51) Int. Cl.
*H01M 10/04* (2006.01)
*H01M 50/70* (2021.01)
*H01M 50/627* (2021.01)
*H01M 50/673* (2021.01)
*H01M 50/645* (2021.01)

(52) U.S. Cl.
CPC ....... *H01M 50/627* (2021.01); *H01M 50/645* (2021.01); *H01M 50/673* (2021.01); *H01M 50/70* (2021.01)

(58) Field of Classification Search
CPC .. H01M 50/70; H01M 50/609; H01M 50/645; H01M 10/4214; Y02E 60/10; Y02P 70/50
See application file for complete search history.

(56) References Cited

U.S. PATENT DOCUMENTS

| | | | |
|---|---|---|---|
| 6,248,138 B1 * | 6/2001 | Lafave | H01M 50/561 |
| | | | 29/623.1 |
| 6,497,976 B1 | 12/2002 | Morizane | |
| 2003/0064280 A1 | 4/2003 | Morizane | |
| 2003/0207169 A1 | 11/2003 | Tukawaki et al. | |
| 2006/0118582 A1 * | 6/2006 | Hsu-Yeh | B01L 3/0272 |
| | | | 222/633 |
| 2011/0300437 A1 | 12/2011 | Yi | |
| 2012/0107653 A1 * | 5/2012 | Guen | H01M 50/636 |
| | | | 429/72 |
| 2016/0020452 A1 | 1/2016 | Choi et al. | |
| 2016/0254523 A1 * | 9/2016 | Tsukui | H01M 10/0481 |
| | | | 29/623.1 |
| 2016/0294014 A1 | 10/2016 | Shirai et al. | |

FOREIGN PATENT DOCUMENTS

| | | | |
|---|---|---|---|
| JP | 2008078053 A | 4/2008 | |
| JP | 2010080105 A | 4/2010 | |
| JP | 2011181388 A | 9/2011 | |
| JP | 2015079578 A | 4/2015 | |
| KR | 19980037990 A | 8/1998 | |
| KR | 20010050835 A | 6/2001 | |
| KR | 20040080047 A | 9/2004 | |
| KR | 20110132856 A | 12/2011 | |
| KR | 20120062232 A | 6/2012 | |
| WO | 2015068548 A1 | 5/2015 | |

OTHER PUBLICATIONS

Extended European Search Report for Application No. EP17744535 dated Oct. 2, 2018.
Anonymous: "T-875 Data Sheet Charging Instructions Charger Voltage Settings (AT 7JCF/25°C ) System Voltage 8V 24V 48V Product Specifications BCI Group Size Type Capacity A Minutes CAPACITY Amp-Hours (AH) Energy (kWh) Terminal Type G Dimensions C Inches (mm) Weight lbs. (kg) @25 Amps @56 Amps 5-Hr Rate 10-Hr Rate", Nov. 5, 2015 (Nov. 5, 2015), XP055689175, Retrieved from the Internet:URL:https://web.archive.org/web/20151105235025if_/ http://www.trojanbattery.com.80/pdf/datasheets/1875_Trojan_Data_Sheets.pdf [retrieved on Apr. 24, 2020], 2 pages.

* cited by examiner

FIG. 6
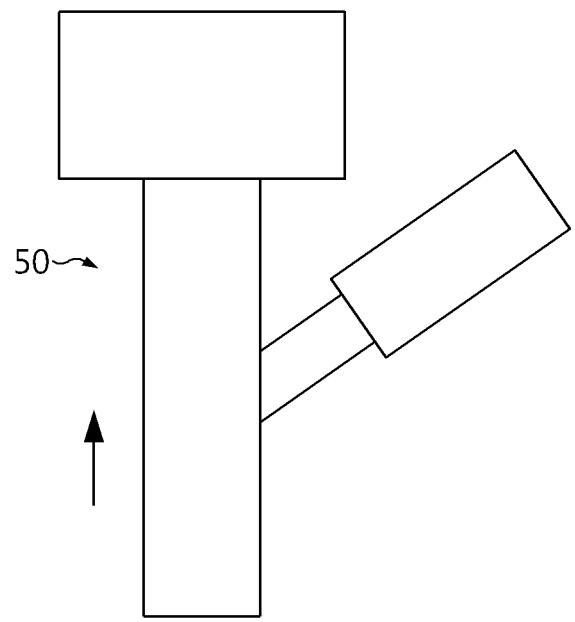
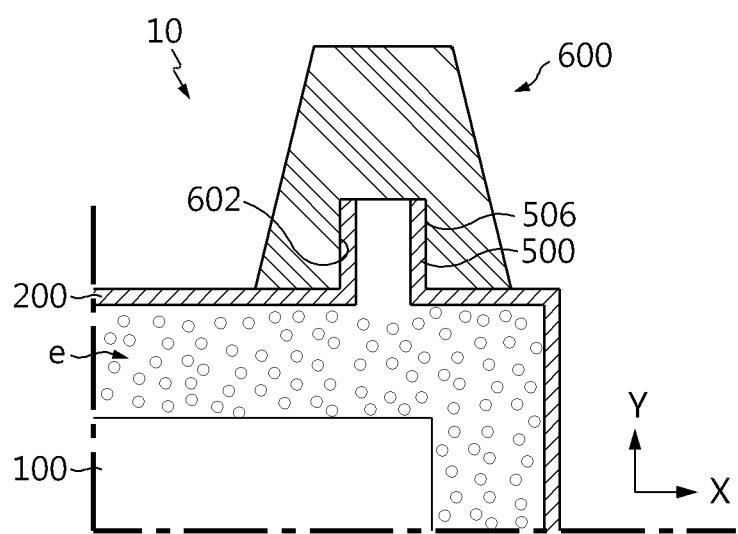

BATTERY CELL AND METHOD FOR MANUFACTURING BATTERY CELL

CROSS-REFERENCE TO RELATED APPLICATIONS

The present application is a continuation of U.S. patent application Ser. No. 15/768,325, filed on Apr. 13, 2018, which is a national phase entry under 35 U.S.C. § 371 of International Application No. PCT/KR2017/000827, filed on Jan. 24, 2017, which claims priority from Korean Patent Application No. 10-2016-0011418, filed on Jan. 29, 2016, the disclosures of which are incorporated herein by reference.

TECHNICAL FIELD

The present disclosure relates to a battery cell and a method for manufacturing the battery cell.

BACKGROUND ART

Secondary batteries which are highly applicable to various products and exhibit superior electrical properties such as high energy density, etc. are commonly used not only in portable devices but also in electric vehicles (EVs) or hybrid electric vehicles (HEVs) driven by electrical power sources. The secondary battery is drawing attentions as a new energy source for enhancing energy efficiency and environment friendliness in that the use of fossil fuels can be reduced greatly and no byproduct is generated during energy consumption.

Secondary batteries widely used at the preset include lithium ion batteries, lithium polymer batteries, nickel cadmium batteries, nickel hydrogen batteries, nickel zinc batteries and the like. An operating voltage of the unit secondary battery cell, namely a unit battery cell, is about 2.5V to 4.2V. Therefore, if a higher output voltage is required, a plurality of battery cells may be connected in series to configure a battery pack. In addition, depending on the charge/discharge capacity required for the battery pack, a plurality of battery cells may be connected in parallel to configure a battery pack. Thus, the number of battery cells included in the battery pack may be variously set according to the required output voltage or the demanded charge/discharge capacity.

Meanwhile, when a plurality of battery cells are connected in series or in parallel to configure a battery pack, it is common to configure a battery module composed of at least one battery cell first, and then configure a battery pack by using at least one battery module and adding other components.

When the battery cell is manufactured, an electrolyte is injected into a battery case that accommodates an electrode assembly. In order to inject the electrolyte, in the conventional battery cell manufacturing process, after a battery cell is disposed in a vacuum chamber of a vacuum state, an electrolyte is injected into the vacuum chamber, and then if the electrolyte is completely injected, the battery case is sealed in the vacuum chamber.

However, for the conventional battery cell, facilities for injecting an electrolyte into the vacuum chamber and sealing the battery case should be provided, and thus its implementation is difficult due to the complicated facilities. This is a major factor that increases the manufacturing cost of the battery cell and decreases the productivity.

In addition, for the conventional battery cell, the battery case should be cut and then sealed again in a vacuum state in order to remove gaseous products.

Moreover, after the conventional battery cell is completely manufactured, it is not possible to inject an additional electrolyte into the battery case or remove gas from the battery case.

Thus, it is required to search for a battery cell which may allow an electrolyte to be easily injected into a battery case thereof and also ensure easy management in the future, and a method for manufacturing the battery cell.

DISCLOSURE

Technical Problem

Thus, the present disclosure is directed to providing a battery cell which may allow an electrolyte to be easily injected into a battery case thereof and also ensure easy management in the future, and a method for manufacturing the battery cell.

Technical Solution

In one aspect of the present disclosure, there is provided a battery cell, comprising: an electrode assembly; a pair of electrode leads electrically connected to the electrode assembly; a battery case configured to accommodate the electrode assembly and expose a portion of the pair of electrode leads to the outside; an electrolyte injection hole formed in the battery case and connectable to an electrolyte injecting device that injects an electrolyte in a vacuum state so that the electrolyte is injected into the battery case; and an injection hole cap configured to cover the electrolyte injection hole and mounted to the electrolyte injection hole so as to be detachable from the electrolyte injection hole by user manipulation.

The injection hole cap may be screwed to the electrolyte injection hole.

The electrolyte injection hole may have an inner hollow for injecting the electrolyte into the battery case and protrude out of the battery case.

The electrolyte injecting device may be inserted into an outer circumference of the electrolyte injection hole when the electrolyte is injected in the vacuum state.

An outer circumference of the electrolyte injection hole and an inner circumference of the injection hole cap may respectively have threads for the screwing.

The electrolyte injection hole may have an inner hollow for injecting the electrolyte into the battery case and protrude to the inside of the battery case.

The electrolyte injecting device may be inserted into an inner circumference of the electrolyte injection hole when the electrolyte is injected in the vacuum state.

An inner circumference of the electrolyte injection hole and an outer circumference of the injection hole cap may respectively have threads for the screwing.

At least one anti-slip groove for preventing a slip during the user manipulation may be formed at an outer circumference of the injection hole cap.

The electrolyte injecting device may include: an injection cylinder connected to the electrolyte injection hole; a vacuum unit provided at the injection cylinder to decompress the inside of the battery case to a vacuum state; and an electrolyte unit provided at the injection cylinder to provide an electrolyte into the battery case.

In another aspect of the present disclosure, there is also provided a method for manufacturing a battery cell, comprising: separating an injection hole cap, which covers an electrolyte injection hole formed in a battery case of a battery cell, according to user manipulation; connecting an electrolyte injecting device to the electrolyte injection hole; decompressing the inside of the battery case to a vacuum state by using the electrolyte injecting device; injecting an electrolyte into the battery case by using the electrolyte injecting device; separating the electrolyte injecting device from the electrolyte injection hole; and mounting the injection hole cap to the electrolyte injection hole according to user manipulation to cover the electrolyte injection hole.

The injection hole cap may be screwed to the electrolyte injection hole.

The electrolyte injection hole may have an inner hollow for injecting the electrolyte into the battery case and protrude out of the battery case.

The electrolyte injection hole may have an inner hollow for injecting the electrolyte into the battery case and protrude to the inside of the battery case.

At least one anti-slip groove for preventing a slip during the user manipulation may be formed at an outer circumference of the injection hole cap.

Advantageous Effects

According to various embodiments as above, it is possible to provide a battery cell which may allow an electrolyte to be easily injected into a battery case thereof and also ensure easy management in the future, and a method for manufacturing the battery cell.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

FIGS. 3 to 6 are diagrams for illustrating that an electrolyte is injected into the battery cell of FIG. 1.

BEST MODE

The present disclosure will become more apparent by describing in detail the embodiments of the present disclosure with reference to the accompanying drawings. It should be understood that the embodiments disclosed herein are illustrative only for better understanding of the present disclosure, and that the present disclosure may be modified in various ways. In addition, for ease understanding of the present disclosure, the accompanying drawings are not drawn to real scale, but the dimensions of some components may be exaggerated.

Figure 1:
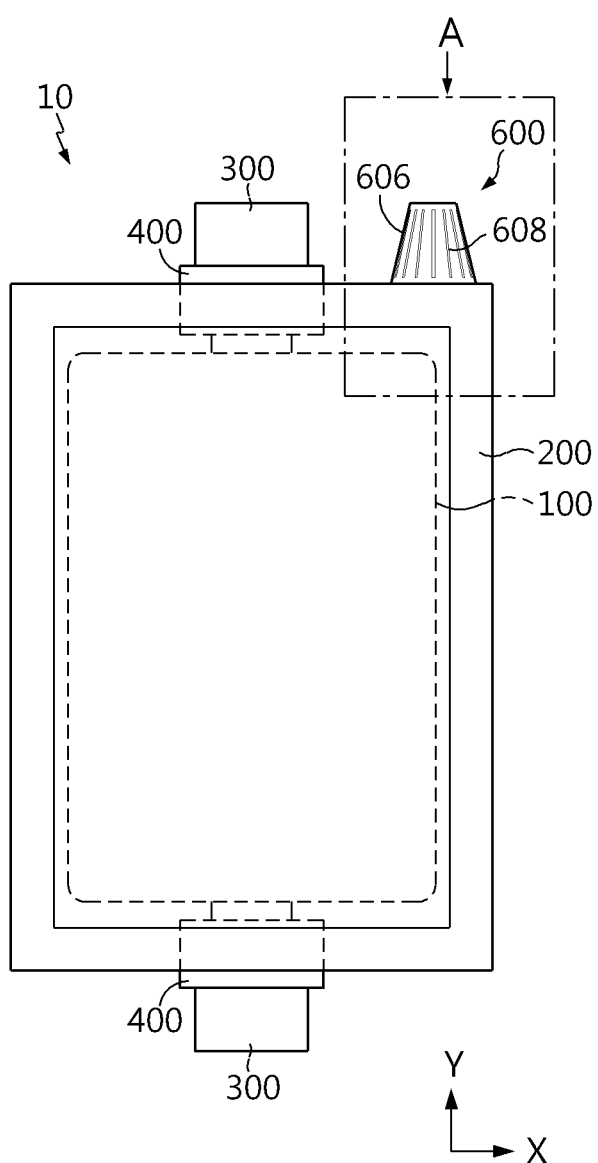
FIG. 1 is a diagram for illustrating a battery cell according to an embodiment of the present disclosure.
Figure 2:
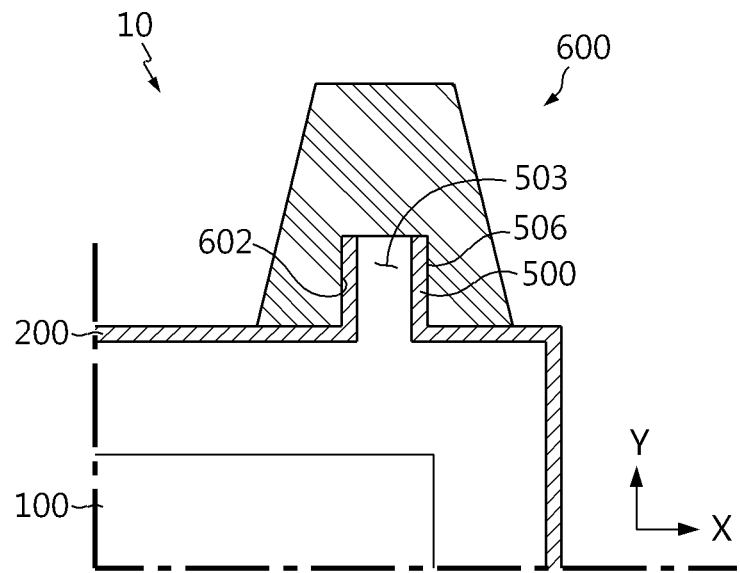
FIG. 2 is a cross-sectioned view showing a portion A of the battery cell of FIG. 1.

FIG. 1 is a diagram for illustrating a battery cell according to an embodiment of the present disclosure, and FIG. 2 is a cross-sectioned view showing a portion A of the battery cell of FIG. 1.

Referring to FIGS. 1 and 2, the battery cell 10 may be a pouch-type secondary battery. The battery cell 10 may be filled with an electrolyte e (see FIG. 6) by using an electrolyte injecting device 50, explained later.

The electrolyte injecting device 50 may include an injection cylinder 51, a vacuum unit 56 and an electrolyte unit 58.

The injection cylinder 51 may be mounted to be connected to the inside of the battery cell 10 and have a predetermined flow path therein. In detail, the injection cylinder 51 may be connected to an electrolyte injection hole 500, explained later, and the electrolyte e and the air inside the battery cell 10 may flow through the flow path of the injection cylinder 51.

The vacuum unit 56 is connected to the injection cylinder 51 and may decompress the inside of the battery cell 10 to a vacuum state. The vacuum unit 56 may suck the air inside the battery cell 10 so that the battery cell 10 comes into a vacuum state.

The electrolyte unit 58 is connected to the injection cylinder 51 and may inject the electrolyte e into the battery cell 10. The electrolyte unit 58 may supply the electrolyte e to the battery cell 10 after the battery cell 10 comes into a vacuum state by the vacuum unit 56.

Seeing the battery cell 10 again, the battery cell 10 may include an electrode assembly 100, a battery case 200, an electrode lead 300, an insulation tape 400, an electrolyte injection hole 500 and an injection hole cap 600.

The electrode assembly 100 may include a positive electrode plate, a negative electrode plate and a separator. The electrode assembly 100 is well known in the art and thus will not be described in detail here.

The battery case 200 may be made of a laminate sheet including a resin layer and a metal layer and accommodate the electrode assembly 100. The battery case 200 may be filled with the electrolyte e by using the electrolyte injecting device 50.

An edge of the battery case 200 exposes a portion of the electrode leads 300, explained later, to the outside and may be sealed to keep the electrode assembly 100 and the electrolyte e airtight therein. The sealing process may be performed before or after the electrolyte e is injected by using the electrolyte injecting device 50.

The electrode lead 300 is provided in a pair, and the pair of electrode leads 300 may include a positive electrode lead and a negative electrode lead. The pair of electrode leads 300 is connected to the electrode assembly 100 and may protrude out of the battery case 200.

The insulating tape 400 may be provided in a number corresponding to the number of the electrode leads 300. In other words, the insulating tape 400 may be provided in a pair. The pair of insulating tapes 400 may prevent a short circuit between the battery case 200 and the electrode lead 300 and improve the sealing of the battery edge 200.

The pair of insulation tapes 400 may be made of a film having insulation and thermal fusion. For example, the pair of insulation tapes 400 may be made of any one material layer (a single layer or a multilayer) selected from polyimide (PI), polypropylene (PP), polyethylene (PE) and polyethylene terephthalate (PET).

The electrolyte injection hole 500 is formed at one side of the battery case 200 and may be connected to the electrolyte injecting device 50 to inject the electrolyte e into the battery case 200. As described above, after being connected to the battery case 200, the electrolyte injecting device 50 may decompress the battery case 200 to a vacuum state and then inject the electrolyte e into the battery case 200.

The electrolyte injection hole 500 has an inner hollow 503 for injecting the electrolyte e and may protrude out of the battery case 200. In addition, a thread for screwing with the injection hole cap 600, explained later, may be formed at an outer circumference 506 of the electrolyte injection hole 500.

The injection cylinder 51 may be inserted into the outer circumference 506 of the electrolyte injection hole 500 when the electrolyte injecting device 50 is mounted. Accordingly, the electrolyte injecting device 50 may be mounted to the electrolyte injection hole 500 more stably.

The injection hole cap 600 covers the electrolyte injection hole 500 and may be mounted to the electrolyte injection hole 500 so as to be detachable from the electrolyte injection hole 500 according to user manipulation.

Accordingly, the injection hole cap 600 may open the inside of the battery case 200 when being detached from the electrolyte injection hole 500 and may seal the inside of the battery case 200 when being mounted to the electrolyte injection hole 500.

The injection hole cap 600 may be screwed to the electrolyte injection hole 500 for easy removal and mounting according to user manipulation. For this, a thread corresponding to the thread of the electrolyte injection hole 500 may be formed at an inner circumference 602 of the injection hole cap 600.

An anti-slip groove 608 may be formed at an outer circumference 606 of the injection hole cap 600. The anti-slip groove 608 is used for preventing a slip during the user manipulation and may be formed to have a predetermined length along a length direction (Y-axial direction) of the injection hole cap 600, which is perpendicular to a rotation direction according to the user manipulation. Also, the anti-slip groove 608 may be provided in plural and spaced apart from each other by a predetermined distance.

Hereinafter, an electrolyte injection process of the battery cell 10 will be described in more detail.

FIGS. 3 to 6 are diagrams for illustrating that an electrolyte is injected into the battery cell of FIG. 1.

Figure 3:
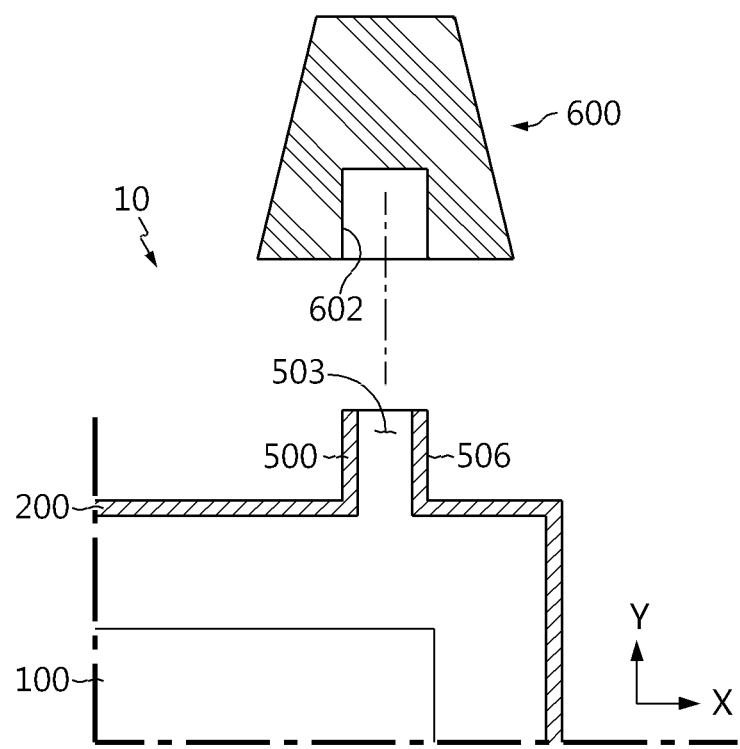

Referring to FIG. 3, when an electrolyte e (see FIG. 6) is injected into the battery cell 10 in order to make the battery cell 10, a manufacturer or the like may separate the injection hole cap 600 from the electrolyte injection hole 500 according to user manipulation to open the battery case 200. Here, the user manipulation may be performed by simply turning the injection hole cap 600 for releasing the screwing.

If the injection hole cap 600 is separated, the electrolyte injection hole 500 exposes the inside of the battery case 200 to the outside. If the battery case 200 is filled with gas or the like, the gas or the like may also be easily removed from the battery case 200 by separating the injection hole cap 600.

Accordingly, in this embodiment, since the gas or the like in the battery case 200 may be removed only by separating the injection hole cap 600, a gas pocket cutting process, demanded to manufacture the battery cell 10, and a sealing process required again after the gas pocket cutting process may be omitted.

Figure 4:
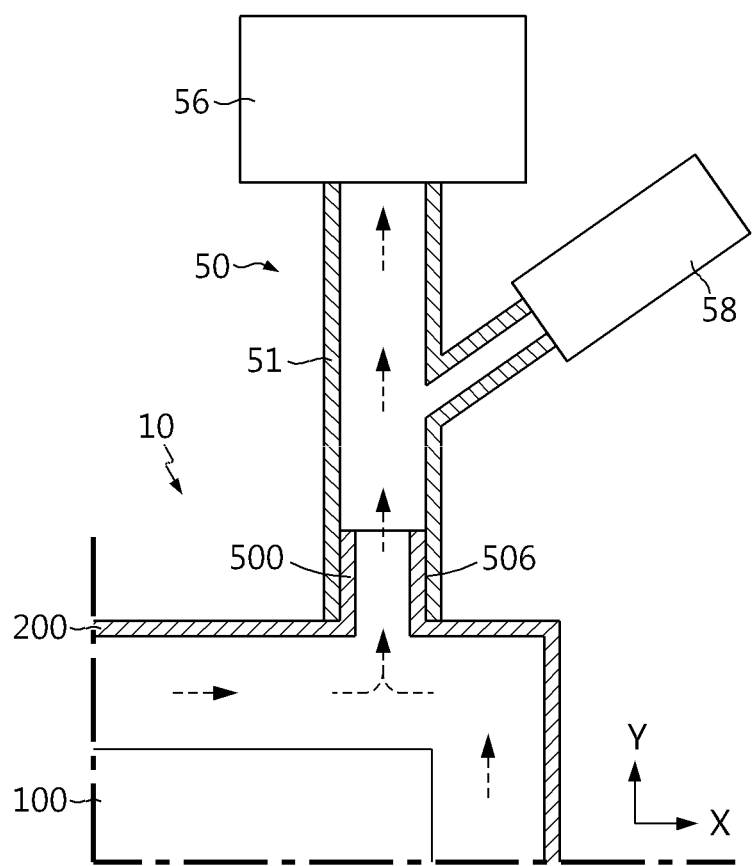

Referring to FIG. 4, after that, the manufacturer or the like may connect the electrolyte injecting device 50 to the opened electrolyte injection hole 500. At this time, the electrolyte injecting device 50 is inserted to surround the outer circumference 506 of the electrolyte injection hole 500 and thus may be stably mounted to the electrolyte injection hole 500.

After that, the manufacturer or the like may inject the air inside the battery case 200 into the vacuum unit 56 through the electrolyte injection hole 500 and the injection cylinder 51 by using the vacuum unit 56 of the electrolyte injecting device 50, so that the inside of the battery case 200 is decompressed to a vacuum state.

In this case, the electrolyte e is easily injected into the electrode assembly 100 in the vacuum state. In addition, when the electrolyte e is injected into the battery case 200, moisture or foreign substances in the air are prevented from entering the battery case 200.

Figure 5:
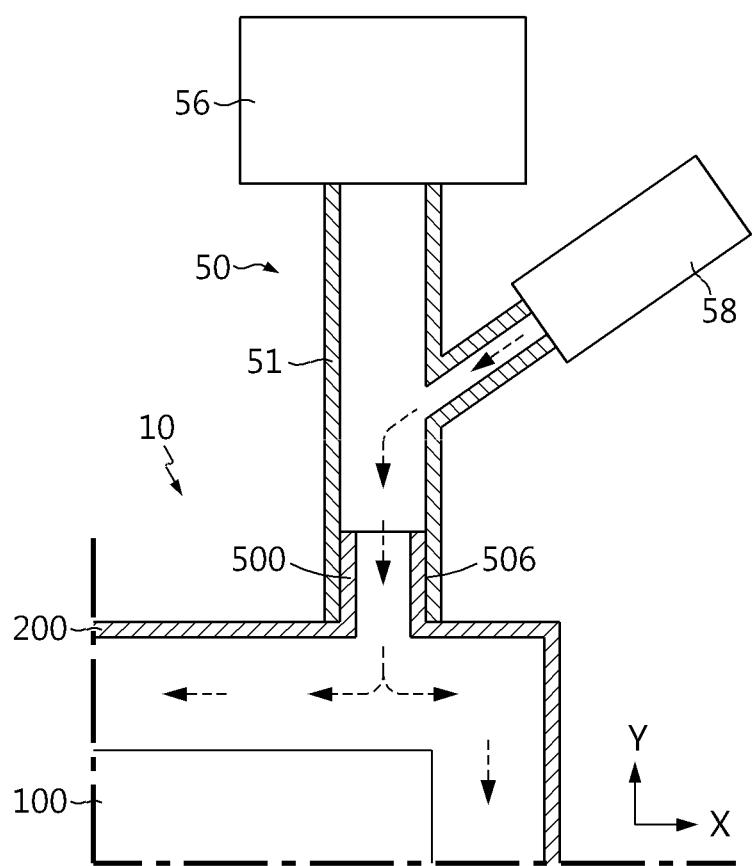

Referring to FIG. 5, if the inside of the battery case 200 comes into the vacuum state, the manufacturer or the like may inject the electrolyte e (see FIG. 6) into the battery case 200 through the electrolyte cylinder 51 and the electrolyte injection hole 500 by using the electrolyte unit 58 of the electrolyte injecting device 50.

Referring to FIG. 6, if the electrolyte e is completely injected, the manufacturer or the like may separate the electrolyte injecting device 50 from the electrolyte injection hole 500. After that, the manufacturer or the like may mount the injection hole cap 600 to the electrolyte injection hole 500 again according to user manipulation to seal the inside of the battery case 200. Here, the user manipulation may be performed by simply turning the injection hole cap 600 for the screwing.

As described above, in the battery cell 10 of this embodiment, it is possible to inject the electrolyte e into the battery case 200 more easily or remove the gas inside the battery case 200 to the outside easily when the battery cell 10 is manufactured using the injection hole cap 600 conveniently detachable according to user manipulation and the electrolyte injection hole 500 connected to the electrolyte injecting device 50.

In addition, in the battery cell 10 of this embodiment, it is possible to inject the electrolyte e into the battery case 200 more easily or remove the gas inside the battery case 200 to the outside easily not only when the battery cell 10 is being manufactured but also at any time after the battery cell 10 is manufactured, by means of the detachable injection hole cap 600.

Moreover, in the battery cell 10 of this embodiment, the sealing process for sealing the battery case 200 may be performed independently at any time before or after the electrolyte e is injected.

Further, as described above, in the battery cell 10 of this embodiment, the gas pocket cutting process for the battery cell 10 and the sealing process performed after the gas pocket cutting process may be omitted when the battery cell 10 is manufactured.

Thus, it is possible to reduce the manufacturing cost of the battery cell 10 of this embodiment and significantly increase the productivity of the battery cell 10.

In addition, while the battery cell 10 of this embodiment is in use, it is easy to inject the electrolyte e and remove the gas, thereby facilitating easy management of the battery cell 10.

Figure 7:
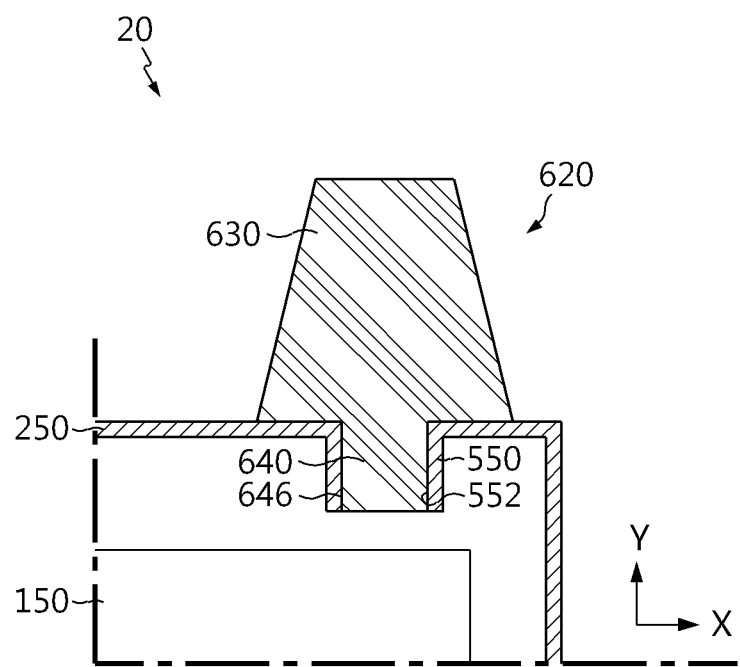
FIGS. 7 to 9 are diagrams for illustrating a battery cell according to another embodiment of the present disclosure.
Figure 8:
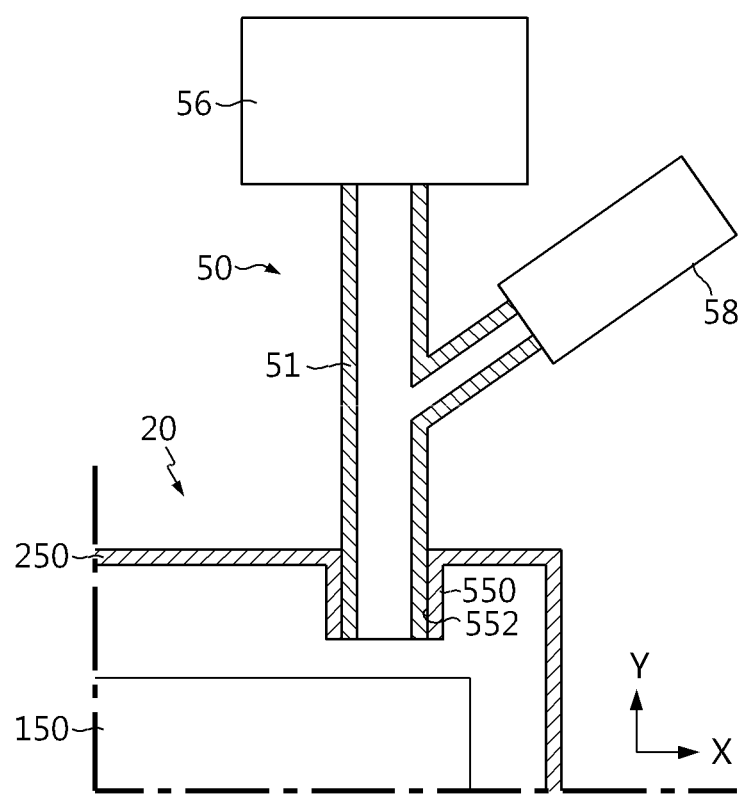
Figure 9:
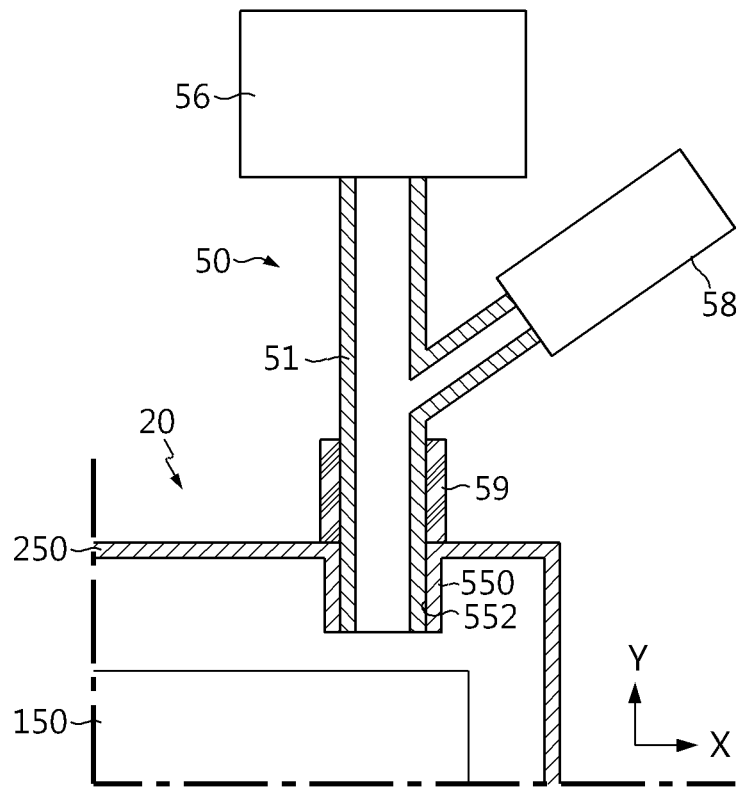

FIGS. 7 to 9 are diagrams for illustrating a battery cell according to another embodiment of the present disclosure.

The battery cell 20 of this embodiment is substantially identical or similar to the battery cell 10 (see FIG. 1) in the former embodiment, and thus the same or similar components are not described in detail and just different features will be described in detail.

Referring to FIGS. 7 to 9, the battery cell 20 may include an electrode assembly 150, a battery case 250, an electrolyte injection hole 550 and an injection hole cap 620. In addition, though not shown in the figures, the battery cell 20 of this embodiment may also include the electrode lead 300 (see FIG. 1) and the insulation tape 400 (see FIG. 1) of the former embodiment.

The electrode assembly 150 and the battery case 250 are similar to the electrode assembly 100 (see FIG. 1) and the battery case 200 (see FIG. 1) of the former embodiment and thus are not described in detail here.

The electrolyte injection hole 550 has an inner hollow for injecting the electrolyte e (see FIG. 6) into the battery case 250 and may be formed to protrude into the battery case 250.

The electrolyte injecting device 50 may be inserted into an inner circumference 552 of the electrolyte injection hole 550. Accordingly, the electrolyte injecting device 50 may be stably mounted to the electrolyte injection hole 550, and after that, the inside of the battery case 250 may be decompressed to a vacuum state by using the vacuum unit 56, and the electrolyte e (see FIG. 6) may be injected into the battery case 250.

Meanwhile, the electrolyte injecting device 50 may further include a mount cylinder 59 as shown in FIG. 9. The mount cylinder 59 is mounted to a lower side of the injection cylinder 51 and may support the injection cylinder 51 when the electrolyte injection hole 550 of the injection cylinder 51 is mounted.

The mount cylinder 59 may be closely adhered to a surface of the battery case 250 when the electrolyte injecting device 50 is mounted. The mount cylinder 59 may prevent the injection cylinder 51 from being twisted or warped and prevent foreign substances from penetrating into the injection cylinder 51.

Meanwhile, the injection cylinder 51 may be provided to be capable of sliding in a vertical direction of the mount cylinder 59. Accordingly, after the injection cylinder 51 completely contacts the surface of the battery case 250, the injection cylinder 51 may be mounted to the electrolyte injection hole 550 while sliding downwardly. In this case, the injection cylinder 51 may be mounted to the electrolyte injection hole 550 more tightly and stably.

In addition, the inner circumference 552 of the electrolyte injection hole 550 may have a thread for screwing with the cap body 640 of the injection hole cap 620, explained later, and for releasing the screwing.

The injection hole cap 620 may include a cap head 630 and a cap body 640.

The cap head 630 may cover the electrolyte injection hole 550 when the injection hole cap 620 is mounted. The cap head 630 is formed to have a diameter larger than the diameter of the electrolyte injection hole 550, and when the injection hole cap 620 is mounted, the cap head 630 come into contact with the battery case 250 at an upper side (+Y-axial direction) of the electrolyte injection hole 550.

Accordingly, the cap head 630 may seal the electrolyte injection hole 550 more reliably when the injection hole cap 620 is mounted, thereby more surely preventing foreign substances or the like from penetrating into the electrolyte injection hole 550.

The cap body 640 extends downward (−Y-axial direction) from the cap head 630 and may be screwed to the inner circumference 552 of the electrolyte injection hole 550 when the injection hole cap 620 is mounted. For this, a thread corresponding to the thread of the electrolyte injection hole 550 may be formed at an outer circumference 646 of the cap body 640.

Figure 10:
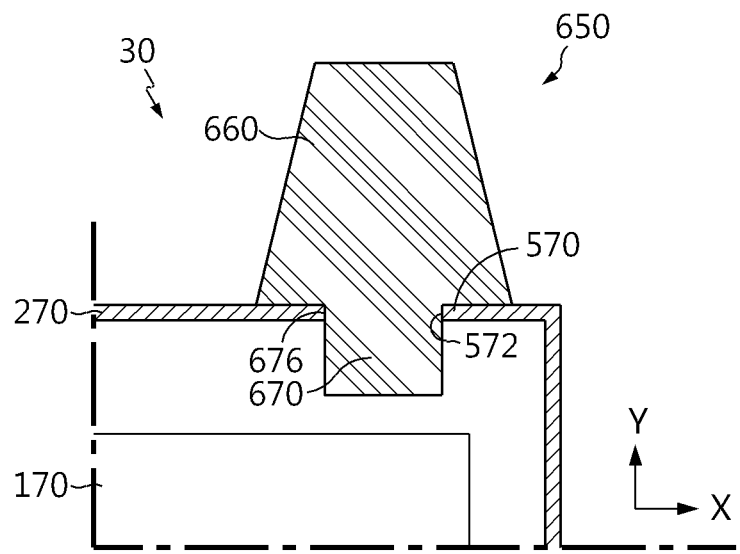
FIG. 10 is a diagram for illustrating a battery cell according to still another embodiment of the present disclosure.

FIG. 10 is a diagram for illustrating a battery cell according to still another embodiment of the present disclosure.

The battery cell 30 of this embodiment is substantially identical or similar to the battery cell 10 (see FIG. 1) in the former embodiment, and thus the same or similar components are not described in detail and just different features will be described in detail.

Referring to FIG. 10, the battery cell 30 may include an electrode assembly 170, a battery case 270, an electrolyte injection hole 570 and an injection hole cap 650. Moreover, though not shown in the figures, the battery cell 30 of this embodiment may also include the electrode lead 300 (see FIG. 1) and the insulation tape 400 (see FIG. 1) of the former embodiment.

The electrode assembly 170 and the battery case 270 are similar to the electrode assembly 100 (see FIG. 1) and the battery case 200 (see FIG. 1) of the former embodiment and thus are not described in detail here.

The electrolyte injection hole 570 may be formed at one side of the battery case 270 to have an inner hollow having the same thickness as the battery case 270. A thread for screwing with the injection hole cap 650, explained later, may be formed at an inner circumference 572 of the electrolyte injection hole 570.

The injection hole cap 650 may include a cap head 660 and a cap body 670.

The cap head 660 covers the electrolyte injection hole 570 and is formed to have a larger diameter than the inner hollow of the electrolyte injection hole 570 so as to contact one side of the battery case 270 when the injection hole cap 650 is mounted.

The cap body 670 extends downward (−Y-axial direction) from the cap head 660 and may be screwed to the inner circumference 572 of the electrolyte injection hole 570 when the injection hole cap 650 is mounted. For this, a thread corresponding to the thread of the electrolyte injection hole 570 may be formed at an outer circumference 676 of the cap body 670.

The cap body 670 may also be detachably mounted to the electrolyte injection hole 570, for example by fitting instead of the screwing. In this case, the process for forming a thread at the cap body 670 and the electrolyte injection hole 570 may be omitted.

Figure 11:
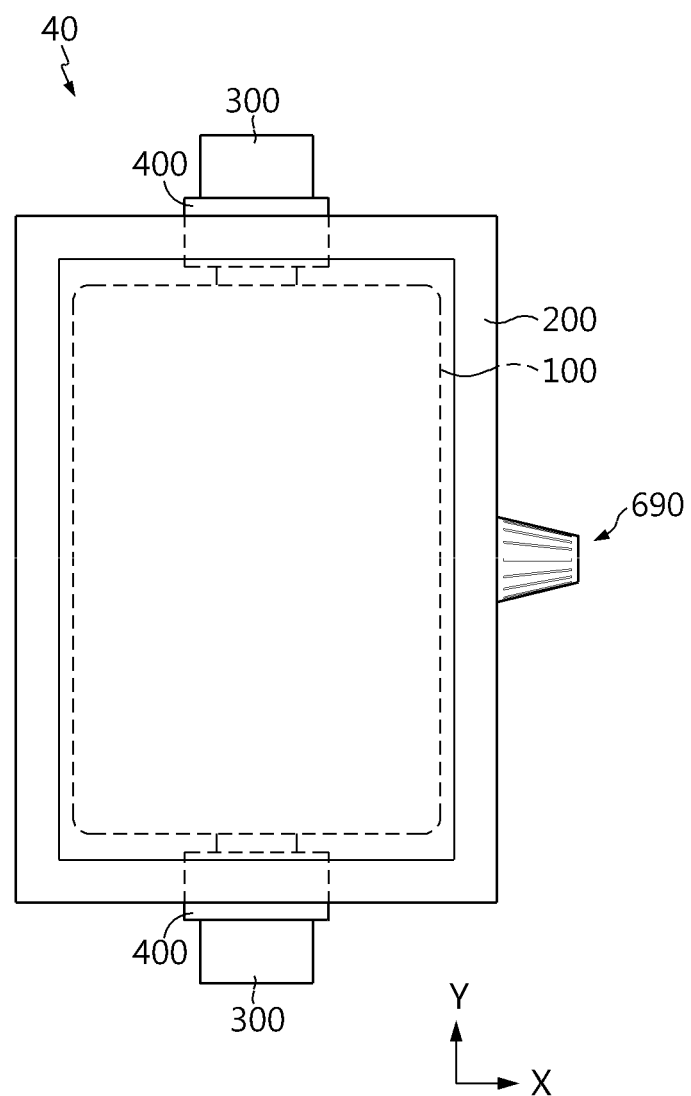
FIG. 11 is a diagram for illustrating a battery cell according to still further another embodiment of the present disclosure.

FIG. 11 is a diagram for illustrating a battery cell according to still further another embodiment of the present disclosure.

The battery cell 40 of this embodiment is substantially identical or similar to the battery cell 10 (see FIG. 1) in the former embodiment, and thus the same or similar components are not described in detail and just different features will be described in detail.

Referring to FIG. 11, the injection hole cap 690 of the battery cell 40 may be provided at one side (+X-axial direction) of both sides (X-axial direction) of the battery case 200. In other words, the injection hole cap 690 may be formed at one side (+X-axial direction) of the battery case 200 where the electrode leads 300 are not provided. In addition, the injection hole cap 690 may be provided at both sides (X-axial direction), instead of being provided at only one side (+X-axial direction or −X-axial direction). Meanwhile, the electrolyte injection hole not depicted in the figure may be formed at a portion of the battery case 200 corresponding to the position of the injection hole cap 690.

Figure 12:
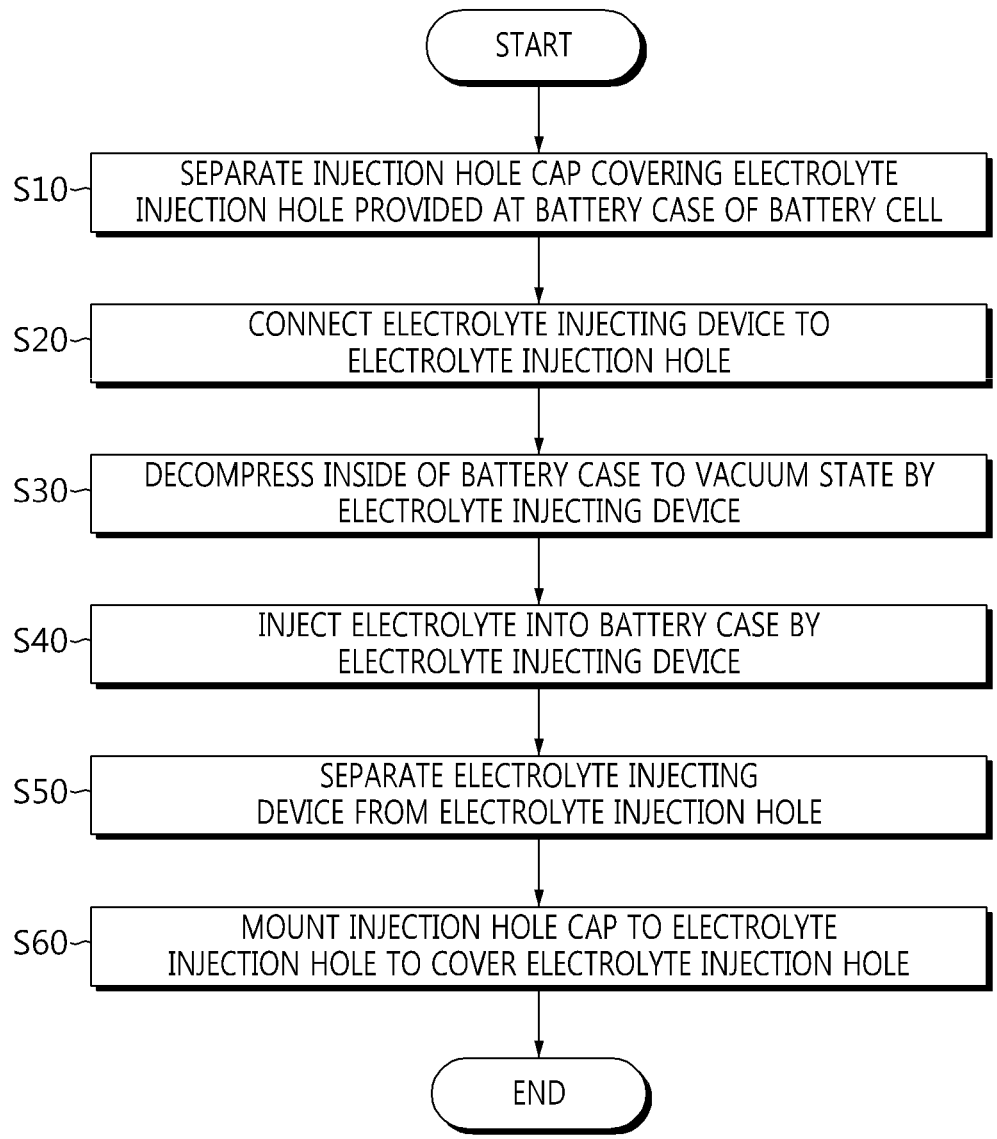
FIG. 12 is a flowchart for illustrating a method for manufacturing a battery cell according to an embodiment of the present disclosure.

FIG. 12 is a flowchart for illustrating a method for manufacturing a battery cell according to an embodiment of the present disclosure.

Referring to FIG. 12, when the electrolyte is injected into the battery cell to manufacture the battery cell, a manufacturer or the like may separate the injection hole cap covering the electrolyte injection hole provided at the battery case of the battery cell according to user manipulation (S10). As the injection hole cap is separated, the inside of the battery case may be exposed to the outside.

After that, the manufacturer or the like may connect an electrolyte injecting device for injecting an electrolyte into the electrolyte injection hole (S20). At this time, the electrolyte injecting device may be stably fixed as being inserted into the electrolyte injection hole.

If the electrolyte injecting device is completely mounted, the manufacturer or the like may decompress the inside of the battery case to a vacuum state by using the electrolyte injecting device (S30), and then, may inject the electrolyte into the battery case by using the electrolyte injecting device (S40).

If the electrolyte is completely injected into the battery case, the manufacturer or the like may separate the electrolyte injecting device from the electrolyte injection hole (S50) and may mount the injection hole cap to the electrolyte injection hole again according to user manipulation to cover the electrolyte injection hole (S60).

As described above, if the method for manufacturing a battery cell according to this embodiment is used, when the battery cell is manufactured, the electrolyte may be more easily injected into the battery case of the battery cell according to simple user manipulation.

While the embodiments of the present disclosure have been shown and described, it should be understood that the present disclosure is not limited to the specific embodiments described, and that various changes and modifications can be made within the scope of the present disclosure by those skilled in the art, and these modifications should not be understood individually from the technical ideas and views of the present disclosure.

What is claimed is:

1. A system for injecting electrolyte, the system comprising:
   a battery cell and an electrolyte injecting device,
   wherein the battery cell includes:
      an electrode assembly comprising flat, planar positive and negative electrode plates and a separator disposed therebetween;
      a pair of electrode leads electrically connected to the electrode assembly;
      a battery case configured to accommodate the electrode assembly and expose a portion of the pair of electrode leads to the outside, the battery case being a pouch-type case, the electrode leads extending through a periphery of the pouch-type case to an outside of the pouch-type case;
      an electrolyte injection hole formed in the battery case and connectable to the electrolyte injecting device that injects an electrolyte in a vacuum state so that the electrolyte is injected into the battery case, the electrolyte injection hole being spaced apart from the electrode leads, the electrolyte injection hole having a diameter smaller than a width of the electrode leads and smaller than a width of the electrode assembly; and
      an injection hole cap configured to cover the electrolyte injection hole and mounted to the electrolyte injection hole so as to be detachable from the electrolyte injection hole by user manipulation,
   wherein the electrolyte injection hole has an inner hollow for injecting the electrolyte into the battery case and protrudes out of the battery case, and
   wherein the electrolyte injecting device is configured to be inserted into an inner circumference of an inner collar of the electrolyte injection hole when the electrolyte is injected in the vacuum state, the inner collar extending into the battery case below an outer surface of the battery case, and
   wherein the electrolyte injecting device includes:
      an injection cylinder connected configured to extend into the electrolyte injection hole, the injection cylinder having an outer diameter that is approximately equal to an inner diameter of the inner collar of the electrolyte injection hole;
      a mounting cylinder extending around an outer circumference of the injection cylinder, the mounting cylinder spaced apart from an open end of the injection cylinder in a longitudinal direction of the injection cylinder and defining a contact surface facing towards the open end of the injection cylinder, the contact surface configured to abut a confronting portion of the outer surface of the battery case extending away from the electrolyte injection hole, the mounting cylinder having an inner diameter that is approximately equal to the outer diameter of the injection cylinder;
      a vacuum unit provided at the injection cylinder to decompress the inside of the battery case to a vacuum state; and
      an electrolyte unit provided at the injection cylinder to provide an electrolyte into the battery case.

2. The system according to claim 1, wherein the injection hole cap is screwed to the electrolyte injection hole.

3. The system according to claim 2, wherein the electrolyte injection hole has an inner hollow for injecting the electrolyte into the battery case and protrudes out of the battery case.

4. The system according to claim 3, wherein the electrolyte injecting device is inserted into an outer circumference of the electrolyte injection hole when the electrolyte is injected in the vacuum state.

5. The system according to claim 3, wherein an outer circumference of the electrolyte injection hole and an inner circumference of the injection hole cap respectively have threads for the screwing.

6. The system according to claim 1, wherein an inner circumference of the electrolyte injection hole and an outer circumference of the injection hole cap respectively have threads for the screwing.

7. The system according to claim 2, wherein at least one anti-slip groove for preventing a slip during the user manipulation is formed at an outer circumference of the injection hole cap.

* * * * *